United States Patent
Briggs et al.

(10) Patent No.: US 10,129,283 B1
(45) Date of Patent: Nov. 13, 2018

(54) DETECTION OF A ROGUE BASE STATION

(71) Applicant: Apple Inc., Cupertino, CA (US)

(72) Inventors: Elliot S. Briggs, Santa Cruz, CA (US); Zhu Ji, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/610,230

(22) Filed: May 31, 2017

(51) Int. Cl.
*H04W 4/00* (2018.01)
*H04W 36/00* (2009.01)
*H04L 29/06* (2006.01)
*H04W 12/12* (2009.01)
*H04W 36/08* (2009.01)
*H04W 48/02* (2009.01)
*H04W 12/02* (2009.01)
*H04W 40/00* (2009.01)
*H04W 72/00* (2009.01)
*H04W 84/04* (2009.01)

(52) U.S. Cl.
CPC ......... *H04L 63/1425* (2013.01); *H04W 12/02* (2013.01); *H04W 12/12* (2013.01); *H04W 36/0094* (2013.01); *H04W 36/08* (2013.01); *H04W 48/02* (2013.01); *H04W 84/042* (2013.01)

(58) Field of Classification Search
CPC ....... H04W 12/06; H04W 8/04; H04W 48/16; H04W 48/18; H04W 60/00; H04W 48/20; H04W 36/30; H04W 4/00; H04W 36/00; H04W 40/00; H04W 72/00
USPC ....................................... 455/435.1
See application file for complete search history.

(56) References Cited

U.S. PATENT DOCUMENTS

2007/0079376 A1* 4/2007 Robert ................ H04L 63/1408 726/23
2013/0023286 A1* 1/2013 Soma ...................... H04W 4/02 455/456.1

FOREIGN PATENT DOCUMENTS

| CN | 104244250 A | 12/2014 |
| CN | 105451232 A | 3/2016 |
| CN | 105959954 A | 9/2016 |
| EP | 1783997 | 9/2007 |
| EP | 1860858 | 11/2007 |
| WO | 2009031972 | 3/2009 |
| WO | 2016096836 A1 | 6/2016 |

OTHER PUBLICATIONS

Shaik et al.; Practical Attacks Against Privacy and Availability in 4G/LTE Mobile Communication Systems; Available from the Cornell University Library at https://arxiv.org/pdf/1510.07563; Feb. 11, 2016; 16 pages.

(Continued)

*Primary Examiner* — Huy C Ho
(74) *Attorney, Agent, or Firm* — Dickinson Wright RLLP

(57) ABSTRACT

A device observes base station signals and identifies those that are suspicious and those that are normal. The device avoids communication with the sources of suspicious signals. A rogue base station may be the source of suspicious signals. A system operated by a mobile network operator is a source of normal signals. A rogue operator and the mobile network operator have different goals and those differences are the basis of embodiments provided herein to detect the rogue base station. The observations are characterized by message rates, waveform accuracy, cell parameters, and synchronization level.

20 Claims, 13 Drawing Sheets

(56) References Cited

OTHER PUBLICATIONS

International Patent Application No. PCT/CN2017/086652—International Search Report and the Written Opinion dated Feb. 22, 2018.

* cited by examiner

US 10,129,283 B1

DETECTION OF A ROGUE BASE STATION

FIELD

The described embodiments relate generally to multiple access wireless communications using electronic devices, including systems and techniques for analyzing waveforms and signaling messages from a base station and determining whether communication with the base station should be avoided.

BACKGROUND

Security and privacy of a user of a wireless device may be attacked by a malicious party. One class of attacks is based on the malicious party placing a piece of radio equipment out in the public where a legitimate mobile network operator (MNO) is providing services. The equipment placed or in the control of the malicious party transmits signals which appear to be legitimate base station signals. Such a piece of radio equipment is referred to herein as a rogue base station run by a rogue operator or hacker. A wireless device, also called a user equipment (UE), may place some trust in the signals from the rogue base station and proceed to attempt to establish or maintain communications using the rogue base station. The rogue base station may attempt to use the UE signals to estimate a geographic location of the UE, an identity of a subscriber using the UE (the name of the person using the wireless device), or to block service to the UE from the legitimate MNO. Blocking service may be referred to as a denial of service (DOS) attack. Some rogue base station behavior is described in A. Shjai et al. "Practical Attacks Against Privacy and Availability in 4G/LTE Mobile Communication Systems," archived online with the identifier arXiv:1510.07563v2 [cs.CR] 11 Feb. 2016 (hereinafter "Practical Attacks").

The Third Generation Partnership Project (3GPP) standards development organization has developed and continues to develop a set of standards referred to as Long Term Evolution (LTE). Some embodiments disclosed herein are illustrated with respect to the 3GPP LTE standards. Further details of LTE standards can be found in i) 3GPP 36.213 v14.2.0, March 2017, "Physical layer procedures," (hereinafter "3GPP 36.213"), ii) 3GPP 36.212 v14.2.0, March 2017, "Multiplexing and channel coding," (hereinafter "3GPP 36.212"), iii) 3GPP 36.211 v14.2.0, March 2017, "Physical channels and modulation," (hereinafter "3GPP 36.211"), iv) 3GPP 36.321, March 2017, "Medium Access Control (MAC) Protocol Specification," (hereinafter "3GPP 36.321"), v) 3GPP 36.331, March 2017, "Radio Resource Control (RRC) Protocol Specification," (hereinafter "3GPP 36.331"), and vi) 3GPP 36.304, March 2014, "User equipment (UE) procedures in idle mode," (hereinafter "3GPP 36.304").

In general, a base station tower may be used by an MNO to operate one or more sectors, using directional antennas. A common arrangement is to use antennas with a 120 degree beam pattern and maintain three sectors from a single tower at a given frequency band. From the point of view of the MNO, a cell is a geographic region served by one base station or one sector. The signals observed in that geographic region, from the point of view of a UE, may be referred to as a cell.

A base station in an LTE system is generally referred to as an eNodeB. Thus, a rogue base station in an LTE system may be referred to as a rogue eNodeB.

SUMMARY

Representative embodiments set forth herein disclose various systems and techniques for detecting a rogue base station.

A rogue base station can be detected based on the messages it sends and based on the waveforms that it transmits. A UE gathers measurements as it operates in a physical environment. Based on these measurements, the UE determines a rule separating a suspicious observation zone from a normal observation zone.

In some embodiments, the UE collects observations of waveforms and/or signals from a base station and then determines if the waveform and/or signal represent a point in the suspicious observation zone. If the waveform and/or signal are in the suspicious observation zone, then the UE avoids communication with the base station. Avoiding communication includes not reselecting to the base station, or if already in communication, stopping communication with the base station and searching for another base station with which to communicate.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
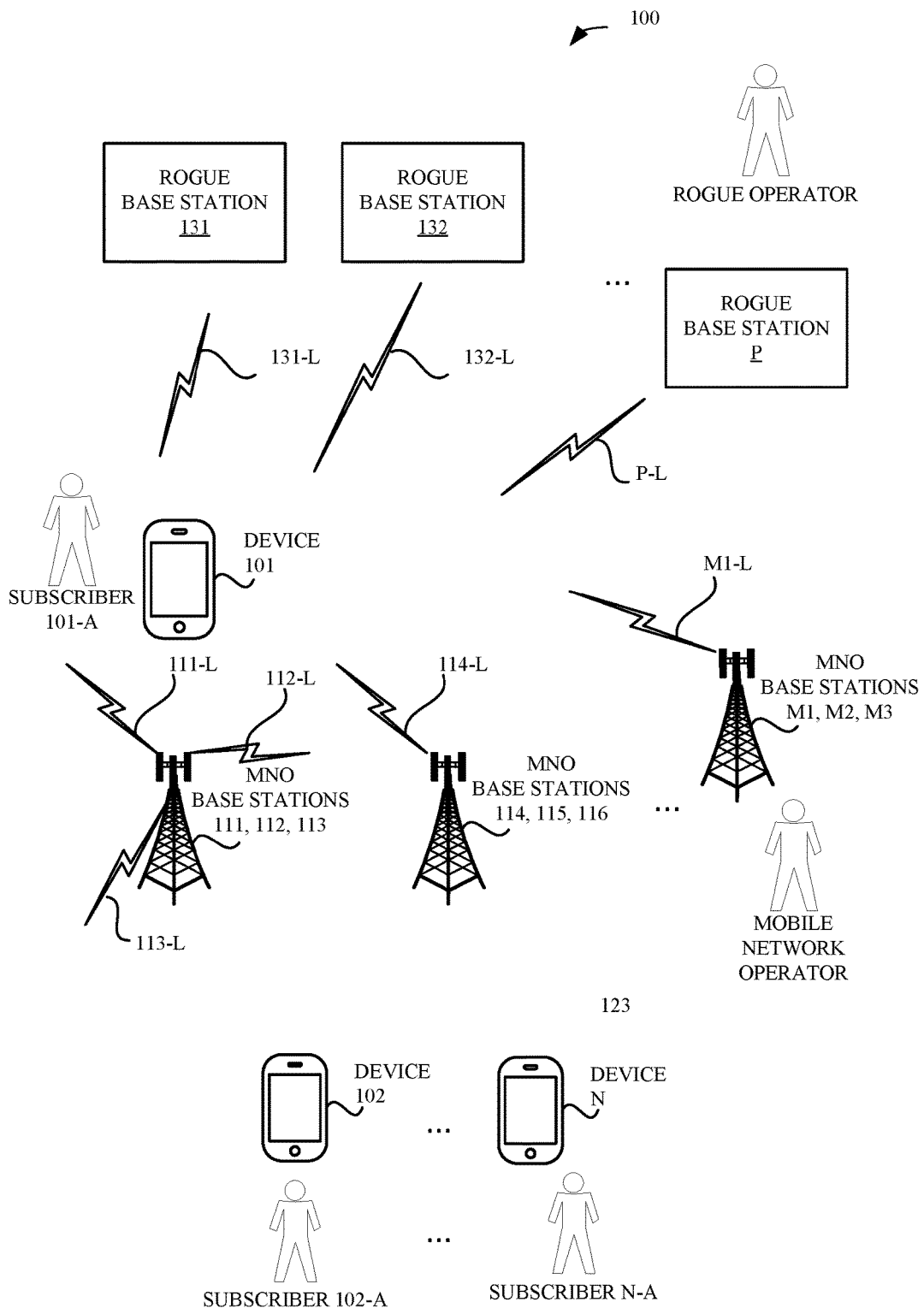
FIG. 1 illustrates an exemplary system including subscribers, devices, and MNO base stations, according to some embodiments. Also illustrated are rogue base stations and a rogue operator.

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

As time passes, a sudden appearance of a strong cell that is broadcasting system information representing a high reselection priority is a suspicious observation. When a UE is considering a cell for reselection, the UE can examine the candidate new cell to see if the signals are properly synchronized with other observed base stations. A rogue operator may find it difficult to, or make no attempt to, synchronize a rogue base station with the surrounding legitimate MNO network. Synchronization includes timing and frequency accuracy of pilot, signaling and data messages, such as with regard to frame timing.

A rogue base station may directly interfere with a UE's serving cell and thus lower the quality of the signal observed by the UE of a serving cell. The rogue base station may do so by producing colliding interference. Colliding interference uses a physical cell identifier (ID) that, when the modulus is calculated with respect to a divisor, for example, of three, matches another cell covering the same geographic area. This colliding interference would inhibit the UE's ability to detect cell-specific reference symbols, and thus make it difficult for the UE to decode downlink control and data channels. Details of UE timing, frequency, and cell ID acquisition can be found in 3GPP 36.213.

A rogue base station may be geographically mobile. The rogue base station may be in an automobile, in a person's backpack, or carried by a passenger on a city transit bus. A UE can determine its own velocity using motion sensors and detect a collection of frequency-shift values (Doppler values) with respect to the motion of the UE with respect to base stations of the MNO network. When a particular cell has a Doppler shift that does not fit in with these collected observations, the particular cell may be in a suspicious observation zone as opposed to a normal observation zone.

Some rogue base stations simulate cellular protocols using software-based LTE emulators. A rogue base station may have an unusual decoding delay or latency for PUSCH and PDSCH channels. LTE requires a 4 ms decoding and turn-around timeline and this performance level is difficult to satisfy using a software-based emulator. A rogue base station may be designed to issue one or more negative acknowledgements (NACKs) to allow the rogue base station software to complete decoding of an uplink signal from a UE. An unusually high number of NACKs in a limited time is an indication that the received signal should be categorized in the suspicious observation zone. When the UE is receiving a strong signal from a cell, a received signal strength indication (RSSI) will be high. When the UE observes a high RSSI but an access message such as RRC Connection Setup on the uplink is followed by a NACK on the downlink, this signal may be categorized in the suspicious observation zone. Further description of PUSCH and PDSCH can be found in 3GPP 36.211.

If the UE is in communication with a cell, a rogue base station may reveal itself by unexpected NACKs in a hybrid ARQ (HARQ) process. HARQ requires that a base station store codewords and form transmission with low latency. PDCCH, PDSCH encoding, and HARQ monitoring are all required, see the Medium Access Control (MAC) Protocol Specification, 3GPP 36.321. A rogue base station may NACK uplink grant requests in order to compensate for decoding latency. A series of NACKs to uplink grant requests coupled with strong RSSI are suspicious. A rogue base station may attempt a DOS attack by sending a NACK in response to any uplink grant request while always assigning grants with new HARQ processes. A rogue base station may compensate for decoding latency due its software emulator by issuing grants with low modulation and coding scheme (MCS) index values. If the rogue base station is presenting a near-cell scenario in order to induce reselection to the rogue base station, reception of grants with high MCS values may be categorized in the suspicious observation zone. Further details of HARQ processes are provided in 3GPP 36.321.

Improper signaling configurations are an indication of a rogue base station. A rogue base station may be using open source software downloaded from the Internet. LTE includes time division duplex (TDD) and frequency division duplex (FDD) versions. In some geographic regions only one or the other of these is supported. If a TDD signal is received in a geographic region that only supports TDD, this signal should be categorized in the suspicious observation zone. Likewise, observation of an FDD signal in a TDD-only region should be categorized as suspicious.

A rogue base station may not have sufficient processing power or information to perform a proper random access channel procedure (RACH). A typical RACH sequence includes four messages: i) Msg1—preamble, sent by the UE and associated with a RACH preamble index value (RAPID), ii) Msg2—RACH Response (RAR), sent by the base station, iii) Msg3—RRC Connection Request, and iv) a Connection Resolution message sent by the base station. Further details of RACH are given in 3GPP 36.211.

A rogue base station may be slow to properly respond to RACH preamble (Msg1). Instead, the rogue base station may send improper RAR messages (Msg2). Msg2 can include a timing advance (TA) value. If the UE sends Msg1 with less than maximum power, the TA value in Msg2 is high (such as the maximum, 2047), and the RAPID value in the RAR correctly corresponds to the Msg1 sent by the UE, this scenario corresponds to a suspicious observation event. System information in system information block 2 (SIB2) infers the geographic are covered by a cell. If SIB2 implies the cell radius is small but TA is high, this contradiction indicates that the observed base station is transmitting signals in the suspicious observation zone. Further details of uplink-downlink frame timing are provided in 3GPP 36.211.

A rogue base station may use a strong transmit signal to attract the attention of a UE and use a large TA value to compensate for decoding latency. Timing advance (TA) provides the UE a metric for both propagation delay as well as end-to-end latency. It is unusual to observe a serving cell with a TA value that is less than that of a very strong neighbor cell. This discrepancy suggests that the very strong neighbor cell is a rogue base station.

System information in a master information block (MIB) indicates the number of transmit antennas supported by the base station and the bandwidth configuration of the base station. A rogue base station may send a MIB that looks typical but does not correspond to the limited hardware resource of the actual rogue base station. The may UE send measurement signals or channel request messages that corresponding to the UE reading of the MIB and current UE application demands. A rogue base station will generally have fewer computational resources in comparison with a legitimate MNO base station and will be only be able to support limited bandwidth traffic in either uplink or downlink.

System information block one (SIB1) includes fields used to calculate neighbor cell quality, or "S-criterion." A rogue base station may use SIB1 values such as q-RxLevMin, q-RxLevMinOffset to favor reselection to the rogue base station from a serving cell. These parameters are referred to as $Q_{rxlevmin}$ and $Q_{rxlevminoffset}$ in 3GPP 36.304. In order to learn UE parameters, the rogue base station may use a tracking area code distinct from the local legitimate network in order to trigger a tracking area update (TAU). If the SIB1 values received from a base station are distinctly different from observed SIB1 values from base stations in the same geographic area, this is an indication that the received SIB 1 signal is in the suspicious observation zone. Further details of master and system information blocks are given in 3GPP 36.331.

System information block two (SIB2) provides the RACH configuration supported by a base station and corresponds to the geographic cell size supported by the base station. Signal detection complexity increases for the base station for a larger cell size and a larger number of simultaneous UEs sending traffic to and receiving traffic from the base station. If a base station is sending a SIB2 that only supports a minimum necessary RACH configuration and this differs from the SIB2 values observed in the same geographic area from other base stations, then this observation belongs in the suspicious observation zone. For example, the UE can observe the rach-ConfigCommon and prach-Config categories and their subfields in order to assess the implied cell size and the processing capabilities of the base station. Along with these categories indicating a small cell while a TA value is large (large cell), this indicates that the SIB2 observation is in the suspicious observation zone.

SIB7 contains GERAN IRAT reselection information, which informs the UE of the parameters needed to reselect to GSM. A rogue base station may attempt to lead a UE to reselect from LTE to GSM to proceed with a GSM call without authentication features in the GSM call. The presence of SIB7 and base station signaling commanding or suggesting a change to an unauthenticated call in an older radio access technology constitute a signal in the suspicious observation zone.

Table 1 summarizes various aspects that can be used to detect a rogue base station.

TABLE 1

Aspects for Detection

| Aspect No. | Description | Discussion |
|---|---|---|
| 1 | Sudden strong signal influencing reselection. | The UE detects this by gathering RSSI data and DL broadcast data over time. |
| 2 | Lack of synchronization. | The UE detects this by observing multiple cells over time and comparing frequency error and timing drift between the cells. |
| 3 | Unexpected Doppler. | The UE detects this by observing multiple cells over time and comparing frequency difference between the cells and a velocity estimate of the UE based on UE motion sensors. |
| 4 | Decoding Latency. | This is caused by inexpensive ("hacker grade") equipment operated by the rogue operator. The UE detects this by noticing if a cell seems to be delaying processing. |
| 5 | Receiving a NACK but the signal is strong. | This event may occur if hacker grade equipment is trying to delay processing. |
| 6 | Low MCS in DL when the RSSI of the cell is strong. | This event may occur if hacker grade equipment is trying to avoid HARQ processing that would occur if additional transmissions were needed because signals were NACKed. |
| 7 | Cell detected but no neighboring sectors are visible. | This can occur because the rogue operator has not set up rogue base stations in a sector arrangement. |
| 8 | Colliding cell codes. | This can occur because the rogue base station is not coordinated with the base stations of the mobile network operator. |
| 9 | Uplink grant requests NACKed at a high rate. | This event may occur if hacker grade equipment is trying to delay processing. |
| 10 | Bogus RAR messages. | This may occur if the rogue base station is practicing a denial of service attack on the UE. The UE repeatedly attempts to access but the rogue base station is unable or unwilling to proceed to establishing a traffic channel. Thus the rogue base station sends RACH response (RAR) messages, but they do not have a standards-compliant signaling payload. |

TABLE 1-continued

Aspects for Detection

| Aspect No. | Description | Discussion |
|---|---|---|
| 11 | Unusual TA value. | The TA value is related to cell size, but the rogue base station is not a true cell and may not be configured to broadcast or assign a proper TA value. |
| 12 | Limited DL bandwidth. | Hacker grade equipment is unlikely to be able to support anything but a minimum LTE bandwidth. |
| 13 | MIB transmit antenna number. | The MIB provides information needed to support multiple information stream such as the number of transmit antennas. A rogue base station is not likely to have many antennas and the MIB may be faked. A faked MIB can be detected by attempting to establish a data session based on the MIB parameters and finding that the base station is not able to commence the data session. A MIB that indicates the base station has one antenna would be suspicious because a deployed network including a base station with only one antenna is unusual. |
| 14 | Handoff-eager cell signals. | A rogue base station will attempt to influence a UE to handoff or reselect to the rogue base station. Such a communication link change serves the rogue operator's purposes of gaining information about the UE, eavesdropping on UE traffic, and denying service to the UE. |
| 15 | Handoff to GSM without authentication. | This unusual event would serve the purpose of degrading the security level protecting UE communications from that available in LTE to a possible insecure GSM mode. |
| 16 | Mobile device transmitted messages in RACH procedure NACKed. | If multiple Msg3 transmission attempts by the mobile device are NACKed, this constitutes a measurement in the suspicious observation zone (see FIG. 2, reference numeral 232). |

Several of the aspects listed in Table 1 are addressed in more detail in discussing the figures. Separating observations into the suspicious observation zone and the normal observation zone (reference numerals 232 and 212 of FIG. 2, respectively) will now be described with respect to the figures.

System

FIG. 1 illustrates a device 101 in a system 100. The device 101 is used by a subscriber 101-A. An MNO operator (the person-figure represents a company) operates a collection of base stations. In FIG. 1, the MNO base stations include 111, 112, and 113 which are in a typical sector arrangement. Also shown are base stations 114, 115, 116 in a sector arrangement and finally base stations M1, M2, and M3 in a sector arrangement. Exemplary signals received from these base stations by the device 101 are indicated by link signals 111-L, 112-L, 114-L and M1-L. MNO 111-A also supplies services to subscribers 102-A through N-A who use, respectively, devices 101, . . . , N. A goal of the MNO operator is to optimize revenue from service contracts with subscribers 101-A through N-A based on its investment in infrastructure including the MNO base stations. The MNO operator wants to increase the number of subscribers because this will increase revenue. Synchronizing the base stations in time and frequency is one technique to optimize capacity of the system operated by the MNO operator. Generally, optimizing capacity requires complex high-precision base station equipment. Also, the MNO operator desires a long term relationship with subscriber 101-A so dropped calls, leaked information and lack of service for the subscriber 101-A are all problems for the MNO operator because subscriber 101-A, if displeased, may consider an alternative service.

FIG. 1 also illustrates a rogue operator operating a rogue base station 131 as well as possibly rogue base stations 132 through P. Exemplary link signals that may be observed by the device 101 are indicated as 131-L, and 132-L through P-L. The rogue operator wants to learn the geographic location of device 101, identity information of device 101 and thus of subscriber 101-A and to possibly deny service of the MNO base stations to subscriber 101-A. The investment criteria for the rogue operator are different than for the MNO operator. The rogue operator may, in some instances, use inexpensive equipment and still learn the geographic location of device 101, learn confidential information of the device 101 and/or the subscriber 101-A, and/or block access of the device 101 to the MNO operator's network. The rogue operator may be financially-constrained.

This economic trade-off provides the background for some of the techniques of this disclosure. For example, rogue base station 131 is not concerned with satisfying a large number of subscribers to stay in long term contracts. Rogue base station 131 may send waveforms that are free-running, that is, are not synchronized with other base stations. The rogue base station 131 may not provide signaling responses within normal time limits because the rogue base station software and hardware is not capable of high-speed operation. These sloppy aspects suggest that signals of this kind are not from a legitimate base station.

Also the rogue base station 131 may send signals that are primarily directed to inducing a UE to try to establish a traffic connection with the rogue base station. In an actual system, UEs are shared among the base stations in order to serve as many subscribers as possible. The MNO operator wants to distribute loading, thus it does not want a busy legitimate base station to service an additional particular subscriber if another base station is not so busy and can instead provide satisfactory service to the additional particular subscriber.

Decision Rule

Figure 2:
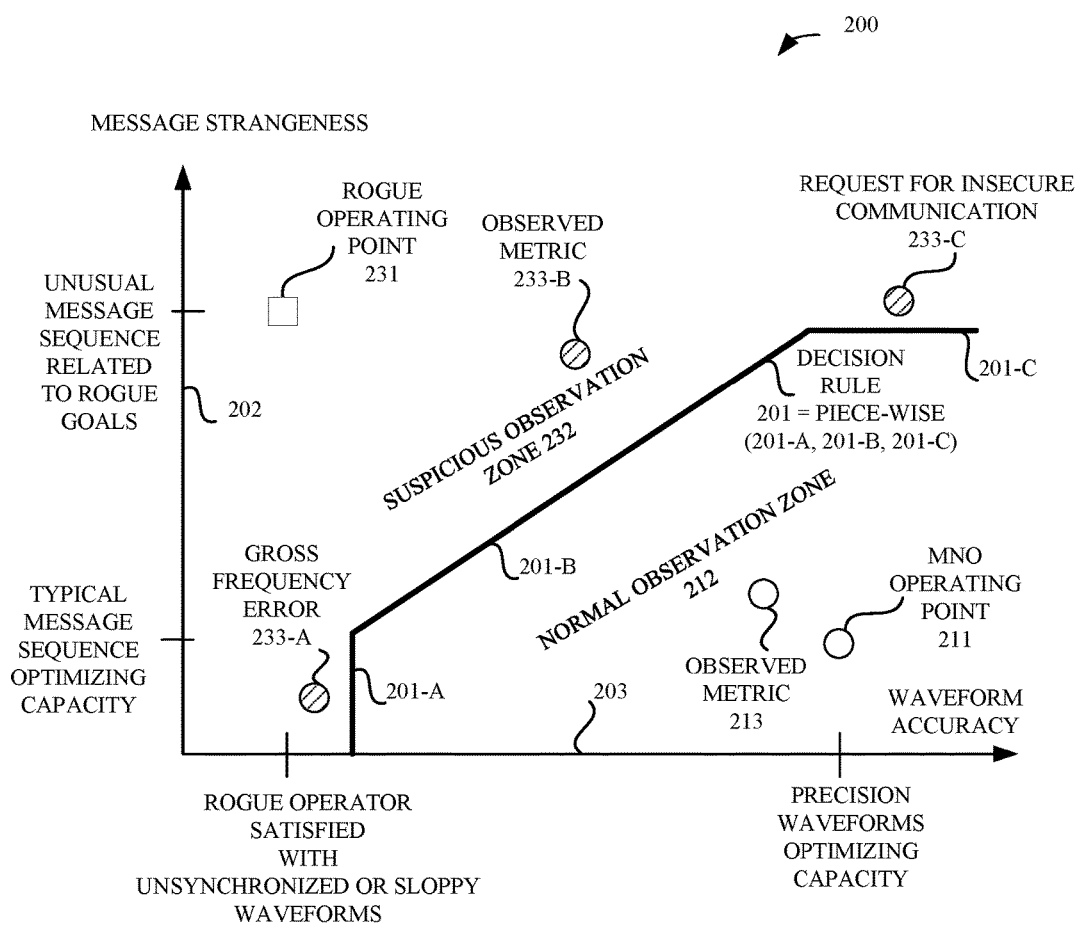
FIG. 2 illustrates an exemplary decision rule separating a suspicious observation zone from a normal observation zone, according to some embodiments.

FIG. 2 provides an exemplary decision space 200 including a decision rule 201. The decision rule 201 is a line form of line segments 201-A, 201-B and 201-C connected piecewise. The y-axis 202 represents the concept of message strangeness. The x-axis-203 represents waveform accuracy.

The rogue operator sends possibly sloppy waveforms and unusual message sequences and operates at a conceptual point 231. The MNO operator uses precision waveforms and sends messages that tend to optimize system capacity while satisfying the subscribers, thus operates at point 211. The decision rule divides the decision space into a suspicious observation zone 232 and a normal observation zone 212. Exemplary suspicious observations include gross frequency error 233-A and request for insecure communication 233-c. Either of these taken alone is sufficient evidence for a UE that the base station that produced 233-A or 233-C should be avoided. Observed metric 233-B is characterized by a somewhat sloppy waveform and a somewhat unusual message sequence. These taken together are enough for the UE to avoid the corresponding source base station. Observed metric 213 is characterized by a mostly-typical message sequence and fairly precise waveforms. These taken together are enough for the UE observing these signals to allow communication with the source base station.

Forming the Decision Rule

Figure 3:
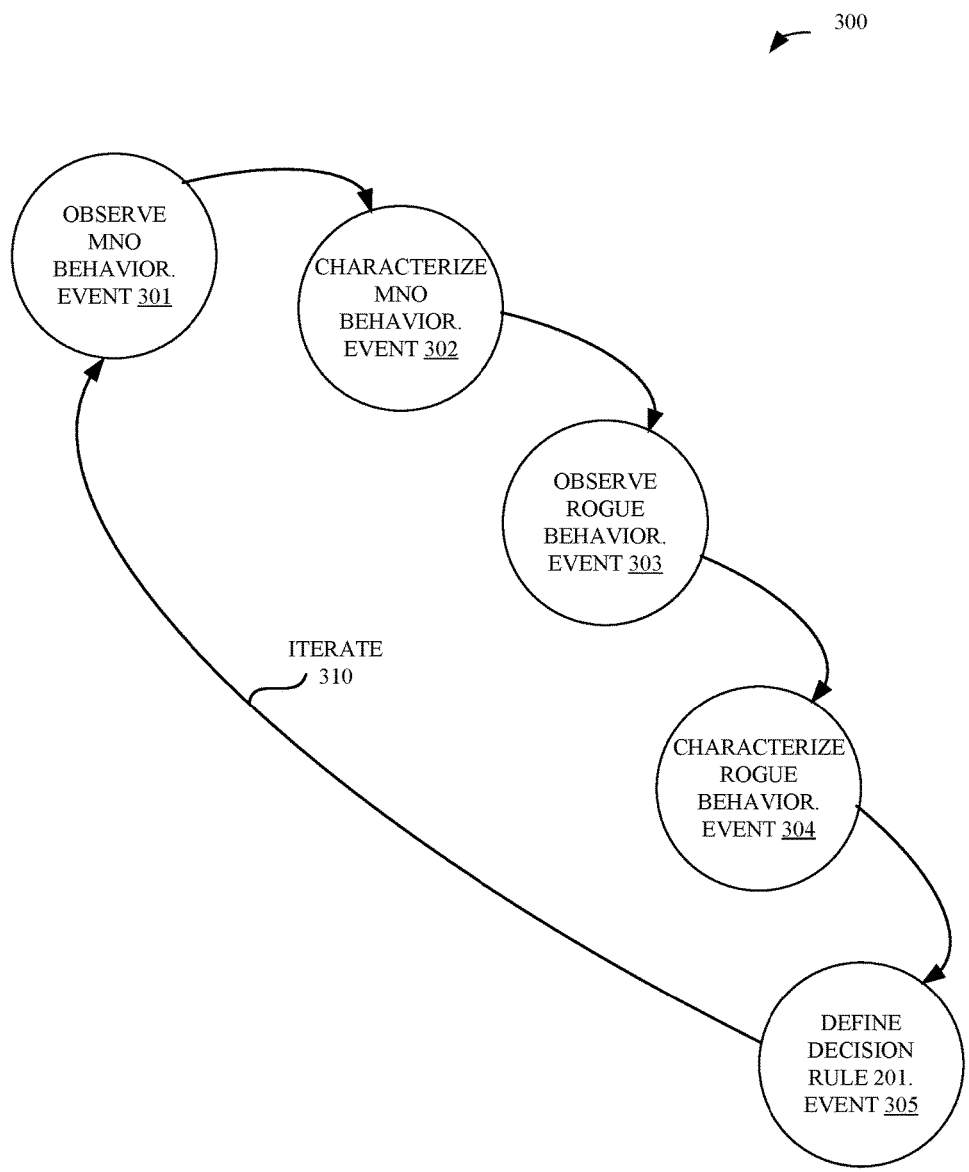
FIG. 3 illustrates an exemplary state flow for defining a decision rule, according to some embodiments.

FIG. 3 provides a method for quantifying decision rule 201. The method starts at event 301. At 301, an observation is made of MNO behavior. Event 301 can be augmented by requirements placed on a base station by a standards development organization (SDO) such as, for example, 3GPP. The SDO documents may describe typical message sequences and also specific waveform characteristics such as signal power to use in a small cell, RACH configurations for small and large cells (SIB2), TA values for small and large cells, parameters that influence reselection (SIB1), and provide performance goals that avoid insecure communications of older radio access technologies. These data characterize the normal observation zone, event 302, and provide its extent in the decision space.

Different cellular systems will have a variety of parameterizations, so a non-exhaustive identification of normal behavior must leave room for uncertainty. Embodiments presented herein rest on the rogue operator goal of inducing reselection or denying service. Embodiments presented herein also use poor physical layer performance of some rogue base stations to provide further evidence of an observation possibly being suspicious. At event 303, observations of rogue behavior are collected. This event is less well-defined than event 301, because the rogue operator has not been a party to an SDO; so there is much less published data. Cryptographic codes are improved by parties practicing in the open trying to break a code and informing the cryptographic community of identified weaknesses. In a similar way, publications may discuss finding and fixing weaknesses due to rogue base stations. An example is the publication Practical Attacks mentioned above. The nature of a rogue is thus somewhat speculative. Open-source software for LTE protocols is a possible component of a rogue base station. Event 303 is thus based on known or simulated rogue base station behavior.

Event 304 indicates that the observed rogue behavior is scattered on to, for example, decision space 200. Finally at event 305, a line is drawn around normal behavior including precise waveforms and capacity-optimizing signaling. The area outside this region is the suspicious observation zone. A good decision rule excludes the rogue behavior and only rarely characterizes a legitimate signal as suspicious (false positive). The suspicious observation zone includes the behavior of unusual attempts to induce reselection while using waveforms that don't fit with the background observable network (e.g., unsynchronized, strange Doppler, and/or unusual TA/RSSI occurrences).

The following examples illustrate exemplary comparisons of observed values from a rogue base station with those expected in a normal network (e.g., MNO base stations of FIG. 1).

Example 1, Large TA Value, not Consistent with RSSI

A serving cell (e.g., MNO base station 111) has a TA corresponding with 400 m of signal propagation delay, RSSI as measured using reference signal received power (RSRP) is medium when, for example, the wireless device location is neither near nor far from the cell site. In this example, a new cell (fake cell, e.g., rogue base station 131) appears with a very strong signal, much stronger than the serving cell (base station 111). The new cell commands the wireless device to use a timing advance (TA) value greater than the serving cell, implying a greater distance from the new cell to the wireless device. This contradiction between the relative signal strength and TA raises suspicion of the new cell.

Example 2—Large TA Value, not Consistent with SIB2

In this example, the serving cell (e.g., MNO base station 111) exists with any TA or signal strength. A new cell (fake cell, e.g., rogue base station 131) appears with a small cell radius implied by the RACH configuration broadcast in SIB2. The new cell commands the wireless device to use a large TA value, much larger than what is implied by SIB2 configuration. This contradiction between SIB2 configuration and the commanded TA value raises suspicion of the new cell.

Example 3—Varying TA Value

In this example, the serving cell (e.g., MNO base station 111) is observed with no particular range of signal strength and commands no particular range of TA value. A new cell (fake cell, e.g., rogue base station 131) appears with any RACH configuration in SIB2. The new cell commands the wireless device to use a maximum configurable TA value. Also, a NACK is sent one or more times in response to Msg3. Then, a smaller TA value is commanded and Msg3 is ACKed. The sequence in Example 3 of maximum TA, NACK to Msg3, then normal operation raises suspicion. Further details of the RACH procedure and in particular Msg3 can be found in 3GPP 36.211.

Example 4

Example 4 begins with Example 3 and then continues into example 1; that is, after the smaller TA value and the ACK, a large TA value is commanded.

Example 5

Example 5 begins with Example 3 and then continues into example 2; that is, after the smaller TA value and the ACK, a large TA value is commanded that does not agree with the apparent cell size from the RACH configuration in SIB2.

Some Exemplary Logic

Figure 4:
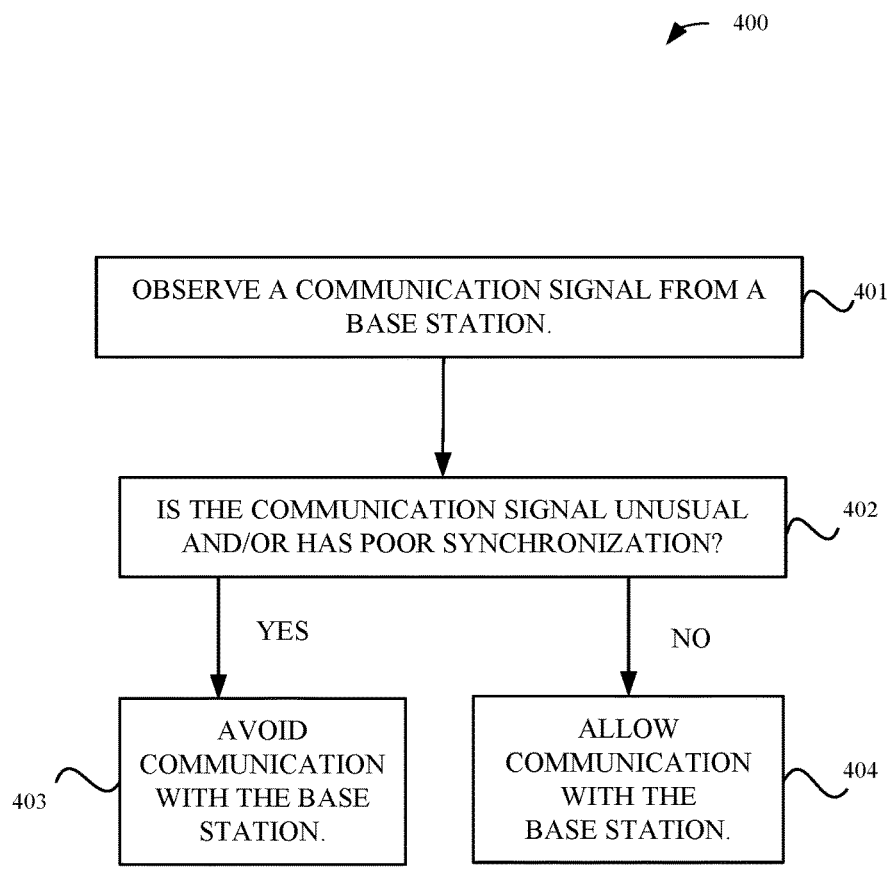
FIG. 4 illustrates exemplary logic determining whether communication should be avoided with a base station, according to some embodiments.

FIG. 4 provides exemplary logic 400 for detecting a rogue base station. At 401, a UE observes a communication signal from a base station. At 402, the UE determines whether the communication signal is unusual and/or of poor quality. Poor quality can include a lack of frequency stability and/or a lack of synchronization with other base stations broadcasting the same network identifier. If the communication signal is unusual and/or of poor quality, the logic flows to 403 and the UE avoids communication with the base station. Otherwise, the logic flows to 404 and the UE allows communication with the base station.

A Message Flow Graph

Figure 5:
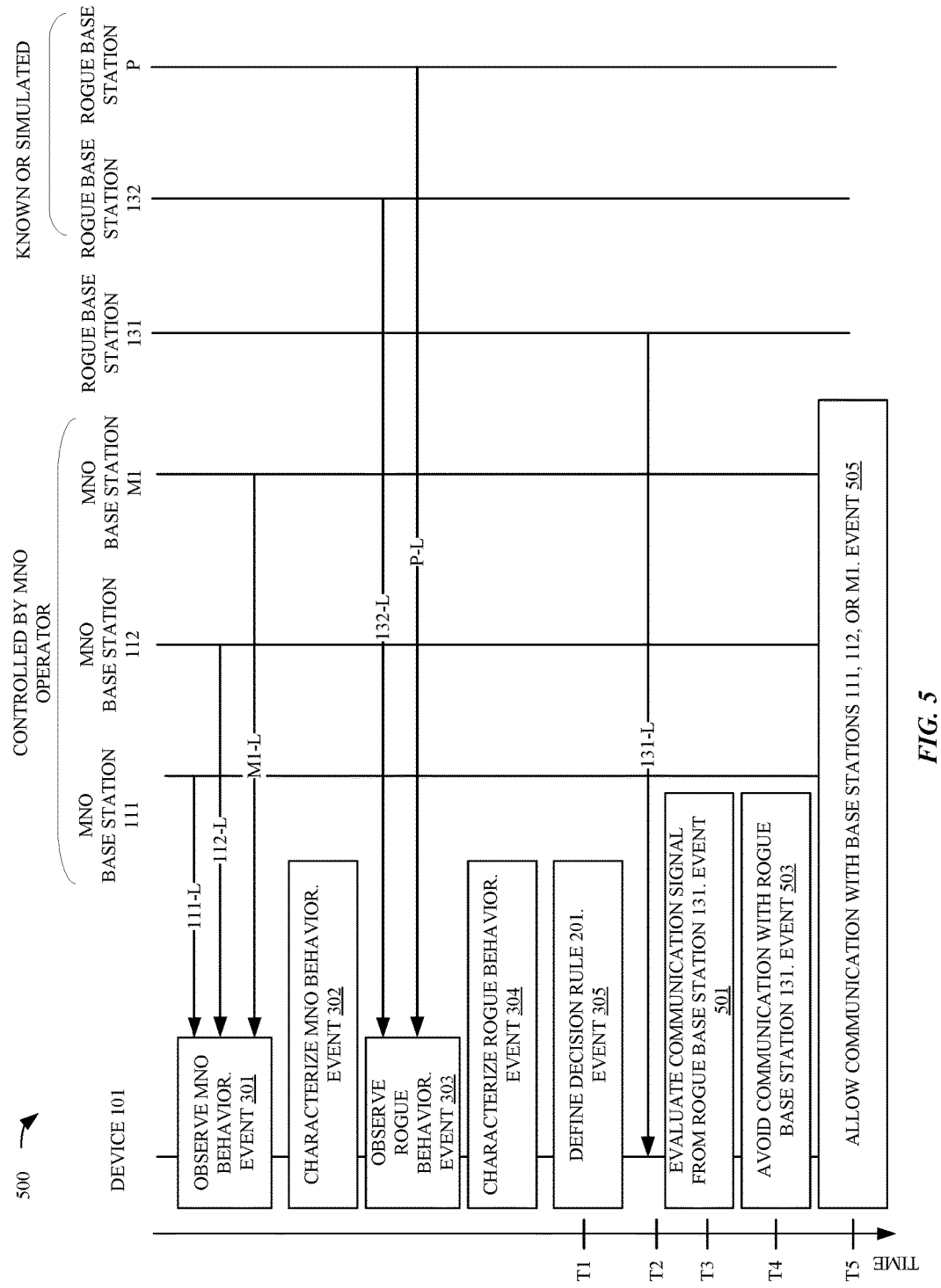
FIG. 5 illustrates exemplary events for defining a decision rule and subsequently evaluating a communication signal, according to some embodiments.

FIG. 5 provides a message flow graph for defining a decision rule and using the decision rule. Entity names from FIG. 1 are shown across the top of the figure. Time advances from top to bottom as indicated by the time axis. Events 301, 302, 303, 304 and 305 of FIG. 3 occur at device 101 and include, in some embodiments, observing exemplary signals from FIG. 1. The events 301, 302, 303, 304, and 305 refer to a controlled situation in which the legitimate base stations are known. The sources of signals 132-L and P-L are somewhat speculative, as described above with respect to FIG. 3 and event 303. At time T1, the decision rule 201 has been defined. This can be done off-line and provisioned to devices 101, 102, . . . , N of FIG. 1.

At time T2 device 101 is no longer in a controlled situation. Device 101 observes or participates in signaling indicated as 131-L with the rogue base station 131. Note that at time T2 device 101 is uncertain of the malicious nature of rogue base station 131. At time T3, the device 101 evaluates the observed communication signal, indicated as event 501. At time T4, the device 101 has placed the signal in the suspicious observation zone 232 and avoids communication with the rogue base station 131. At time T5 and event 505, based on observations after T2 (not shown in FIG. 5) and the decision rule 201, the device 101 allows communications with base stations 111, 112, or M1.

Waveform and Signaling Logic

Figure 6:
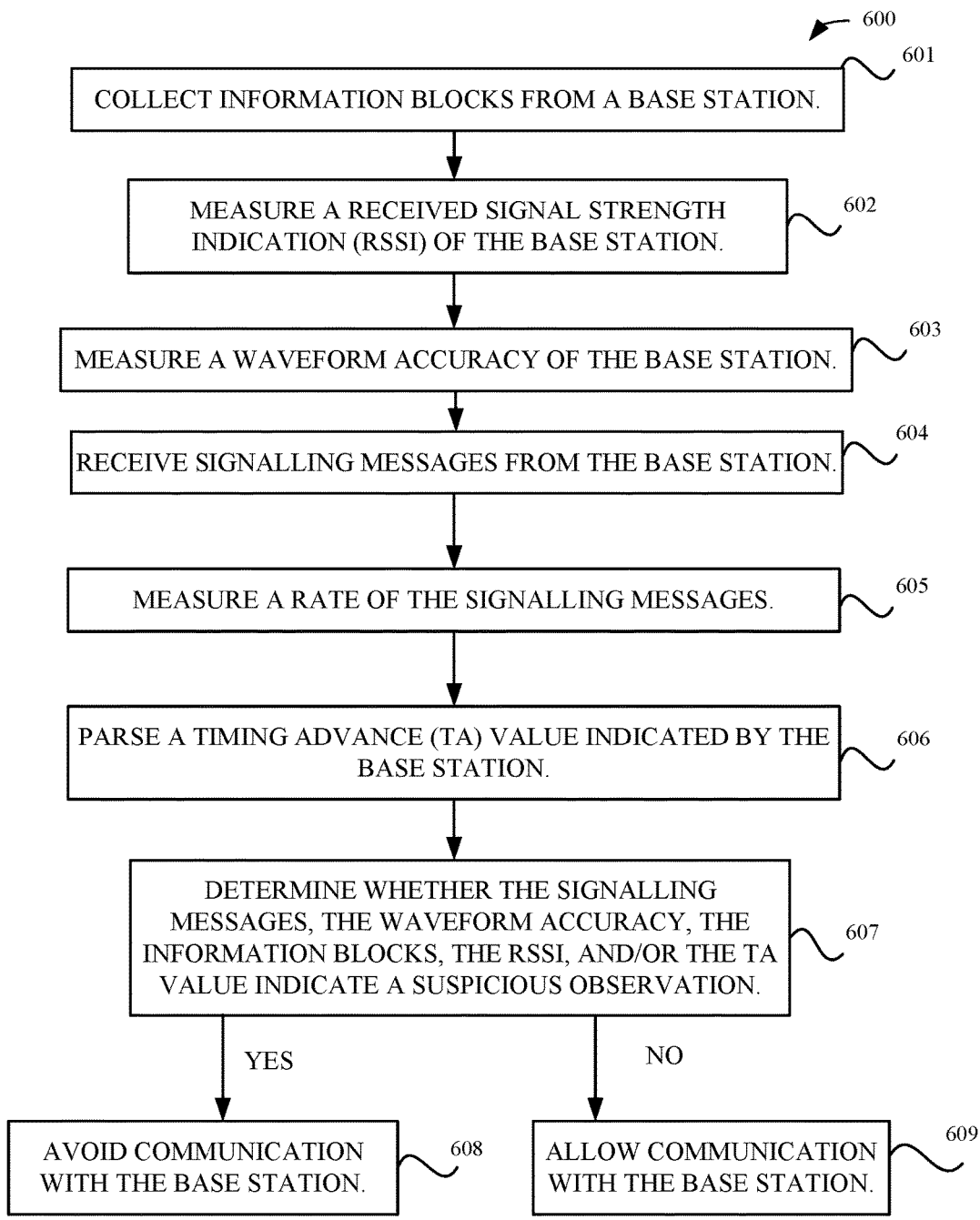
FIG. 6 illustrates exemplary logic for performing measurements, gathering information, and determining whether communication should be avoided with a base station, according to some embodiments.

FIG. 6 provides exemplary logic 600 for detection of a rogue base station. At 601, a UE collects information blocks such as MIB, SIB1, SIB2, and/or SIB7, from a base station. At 602, the UE measures an RSSI of a signal received from the base station. At 603, the UE measures a waveform accuracy of a signal received from the base station. Accuracy can include a synchronization level or a phase accuracy level, or a frame timing relationship. At 604, the UE receives signaling messages from the base station. The signaling messages can be received earlier or later than shown by the position of 604 in logic 600. At 605, the UE measures a rate of the signaling messages. A rate can include how many messages of a certain kind are received from the base station over a time span within a particular signaling scenario such as RACH, HARQ or a request for uplink resources. At 606, the UE parses a TA value from a message sent by the base station. The TA value can be parsed from a broadcast message or a UE-specific message. The TA value can be parsed at a time earlier or later than shown by 606 in the logic 600.

At 607, the UE categorizes the observation and thus makes a decision about whether to communicate with the base station. This decision, in some embodiments, is based on the signaling messages, the waveform accuracy, the information blocks, the RSSI, and/or the TA value. If the UE determines that one or more observations fall in the suspicious observation zone, then the logic flows to 608 and the UE avoids communication with the base station. Avoiding communication can include not initiating communications, breaking off an access attempt, or breaking off a traffic exchange with the base station. If the observations fall in the normal observation zone, then the UE allows communication as shown at 609.

Waveform and Signaling Message Flow

Figure 7:
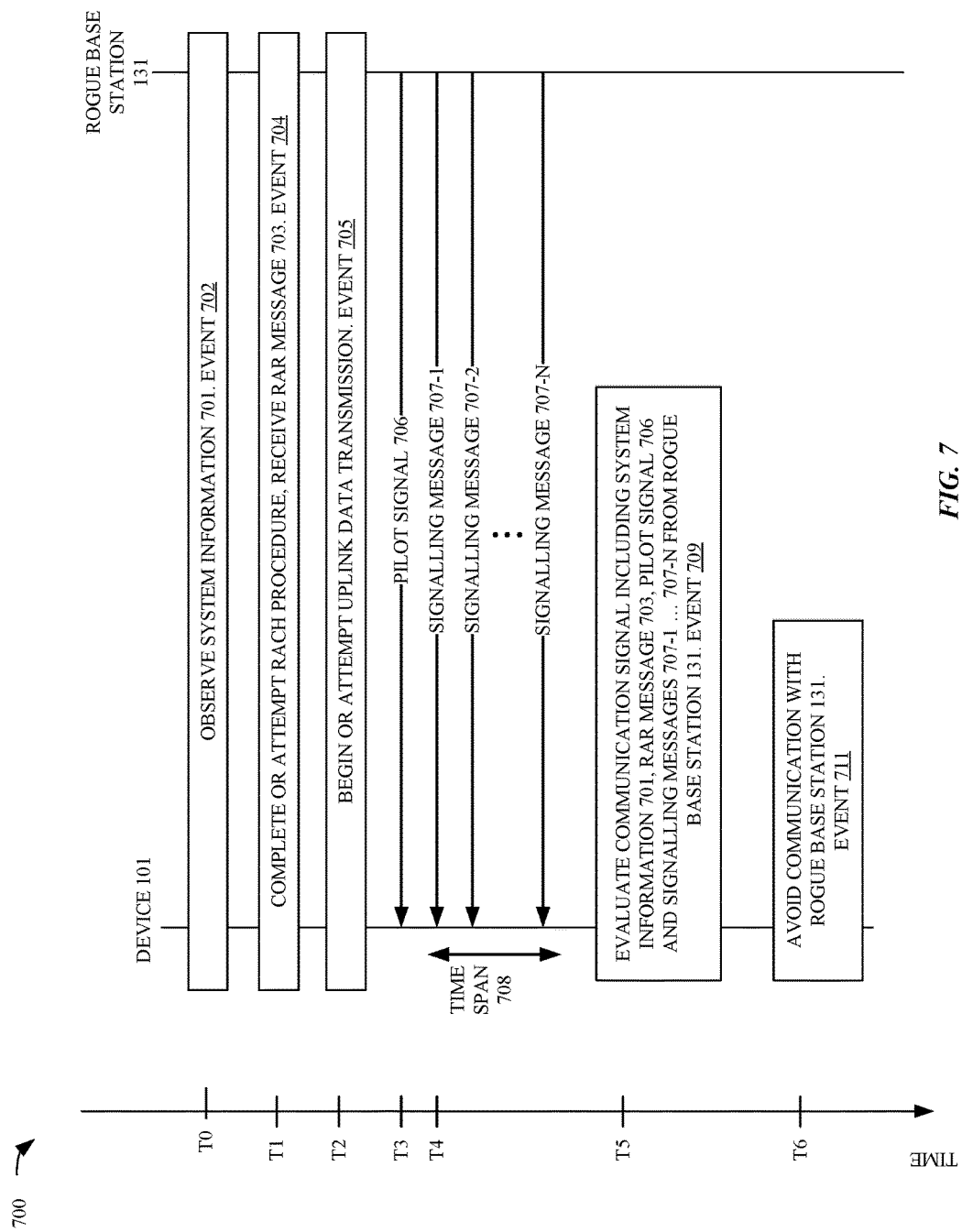
FIG. 7 is an exemplary message flow diagram for performing measurements, gathering information, and determining whether communication should be avoided with a base station, according to some embodiments.

FIG. 7 provides an exemplary message flow 700 in which device 101 endeavors to categorize signals received from rogue base station 131. In some instances, not all events occur. In some instances, the order of the events may be different or one may occur substantially contemporaneously with another.

At time T0, device 101 is uncertain as to whether the base station is malicious or legitimate. At T0 and event 702, the device 101 observes system information 701. System information 701 includes one or more of a MIB, SIB1, SIB2, and/or SIB7 from the rogue base station 131. At T1 and event 704, the device 101 completes a RACH procedure with the rogue base station 131 including receiving a RAR message 703. At T2 and event 705 the device 101 begins uplink data transmission. At T3, reception of pilot signal 706 is indicated. Beginning at T4, a sequence of signaling messages 707-1 through 707-N is received in a time span 708. Interspersed with these messages may be uplink transmissions from the device 101 such as RACH preamble, uplink grant requests, or HARQ data transmission. At T5 and event 709, the device 101 evaluates the communication signal including one or more of the system information 701, RAR message 703, pilot signal 706, and/or signaling messages 707-1 through 7-7-N from rogue base station 131. This evaluation, in some embodiments, is based on the logic 600 particularly 607 of FIG. 6. In the scenario shown in FIG. 7, the device 101 determines that the communication signal falls in the suspicious observation zone 232 and thus avoids communication with the rogue base station 131 at time T6 and event 711.

Some UE Details

Figure 8A:
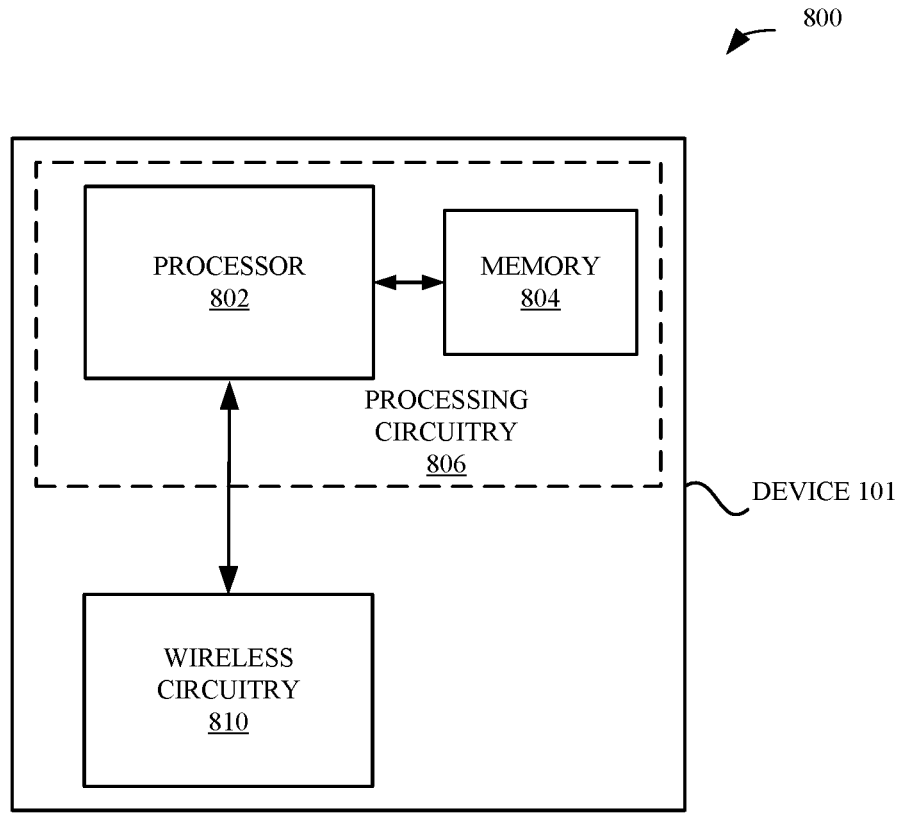
FIG. 8A illustrates exemplary wireless circuitry, processor and memory of the wireless device, according to some embodiments.
Figure 8B:
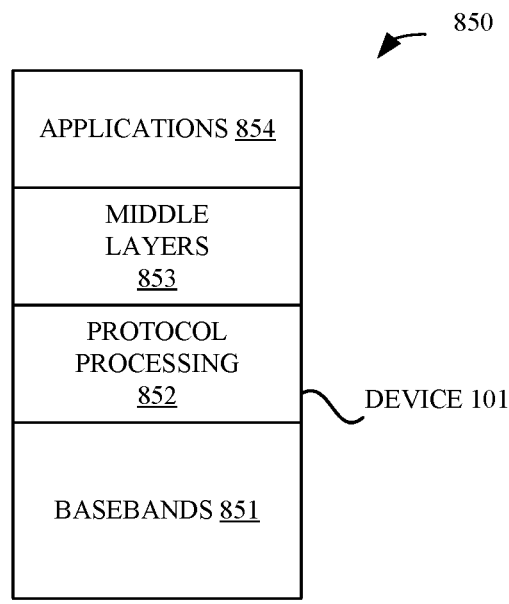
FIG. 8B illustrates an exemplary layer model of the wireless device, according to some embodiments.

FIG. 8A illustrates further detail of the device 101. The device 101 includes wireless circuitry 810 and processing circuitry 806. The processing circuitry 806 includes one or more processors, here represented as a processor 802. The processors communicate with one or more memories, here represented as a memory 804. FIG. 8B illustrates a layer model of the device 101. The layer model includes basebands 851 and protocol processing 852 (e.g., medium access control). The basebands 851 and protocol processing 852 provide software and/or hardware components to support one or more RATs. For example, the basebands 851 and protocol processing 852, in some embodiments, support, in addition to, LTE, Bluetooth® and/or Wi-Fi. FIG. 8B illustrates applications 854, supported by middle layers 853, supported by protocol processing 852 and basebands 851. The applications 854, via a user interface, provide functionality to a user. The applications 854 rely on the lower layers to provide data to them using, for example, the link signals 111-L, 112-L, 114-L and/or M1-L.

Figure 9:
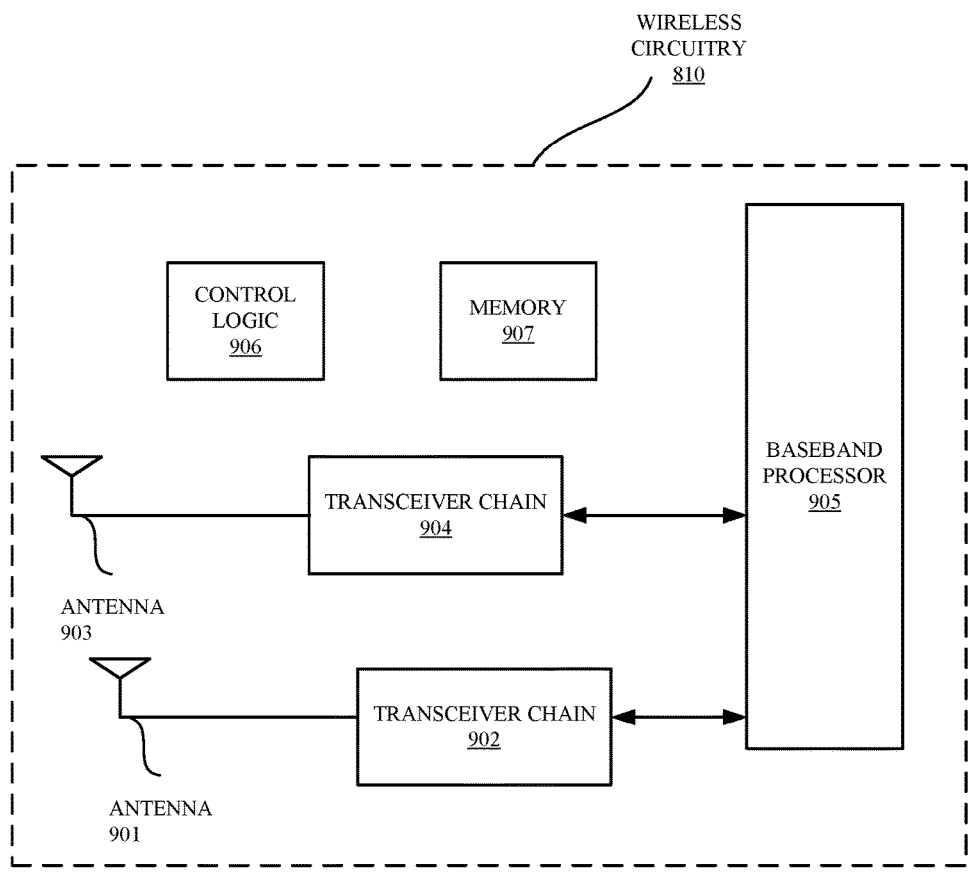
FIG. 9 illustrates further exemplary details of a portion of FIG. 8A, according to some embodiments.

FIG. 9 provides exemplary details of wireless circuitry 810, according to some embodiments. The wireless circuitry includes antennas 901 and 903 connected to transceiver chains 902 and 904, respectively. The transceiver chains are connected to baseband processor 905. The wireless circuitry also includes control logic 906 and memory 907. The baseband processor 905, in some embodiments, performs the protocol processing 852. The baseband processor 905 obtains TA values, measures RSSI, decodes MIB and SIB received transmissions, sends RACH preambles and connection request messages, determines a time span 708 and applies decision rule 201. The baseband processor 905 is also configured to measure synchronization level (or drift) and phase noise power when comparing pilot signals from two different base stations. Memory 907, in some embodiments, stores data representing decision rule 201.

Observation/Comparison Approaches

Figure 10:
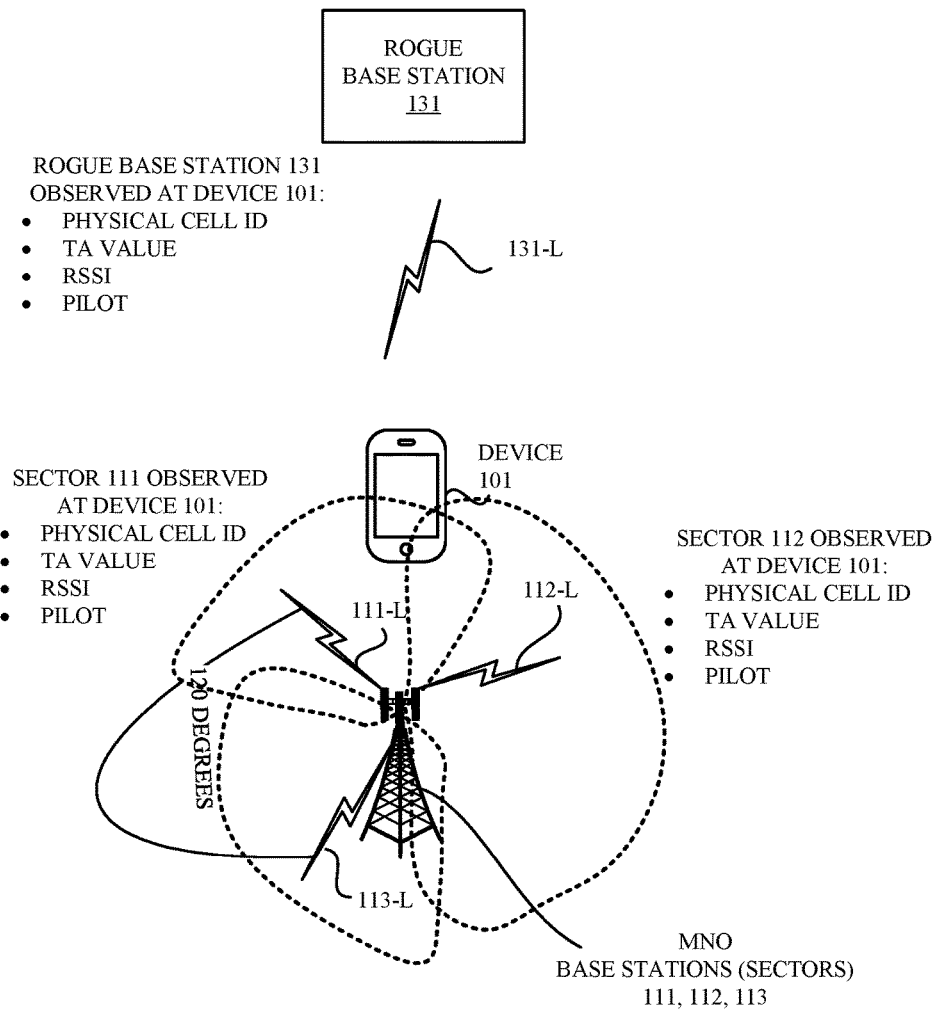
FIG. 10 illustrates an exemplary system situation in which a device collects information and determines whether communication with a base station should be avoided.

FIG. 10 illustrates an exemplary system 1000 with particular attention to the device 101, rogue base station 131, and MNO base stations 111 and 112, also referred to as MNO sectors 111 and 112. The tower representation in FIG. 10 supports antennas for three sectors. The direction, or bore sight, of the antennas have a 120 degree angle separation from one to the next. The link symbols similar to zig-zag lines (e.g., 111-L, 113-L) conceptually illustrate the direction of the bore sight of each antenna and the 120 degree orientation. The dotted lines represent conceptual sector outlines. In terms of geographic position in the example shown in FIG. 10, device 101 is in a region served by MNO sector 111 but also has visibility to the downlink transmissions of sector 112. Device 101 measures received signal strength from each base station or sector to produce an RSSI value for each. Device 101 also observes frame timing of each downlink signal, for example, using synchronization signals provided in LTE. Synchronization signals include primary and secondary synchronization signals (PSS and SSS) which help determine frame timing and cell identification. These signals occur at a regular subframe spacing and are examples of pilot signals. The broadcast channel (BCH) carries the MIB and occurs at another subframe periodicity. With respect to frame timing, a comparison of a first normal synchronous cell to a second will result in a frame timing difference within (+/−) $3*144*T_s$ seconds, where $T_s=1/30.72e6$ seconds. This tolerated frame timing difference corresponds with 3 Normal cyclic prefix lengths. This tolerated frame timing difference is the boundary established by mobile network operators, e.g., Mobile Network Operator of FIG. 1, to allow interference coordination, cancellation and mitigation. Further details of synchronization signals are provided in 3GPP 36.211.

By observing SIB2, device 101 learns RACH configuration parameters for rogue base station 131, MNO sector 111 and MNO sector 112. In the example of FIG. 10, rogue base station 131, MNO sector 111 and MNO sector 112 are referred to sometimes individually as cells and collectively as a collection of observed cells. The SIB2 RACH configurations include TA values. By observing PSS and SSS from each cell in the collection of observed cells, device 101 learns the frame timing of each and RSSI of each. With regard to the observed PSS and/or SSS signals, device 101 can compare one to another to determine degree of synchronization. The device 101 determines the physical cell ID of each cell based on the PSS and SSS signals.

After observing the collection of observed cells, device 101 can perform comparisons with this immediate local data. Sectors 111 and 112 will be synchronized with respect to each other. For example, PSS and SSS of MNO sector 111 will be frequency-locked to PSS and SSS of MNO sector 112. PSS and SSS of rogue base station 131 will drift with respect to those signals in the MNO sectors. Drift means that the start of a frame from rogue base station 131 will not have a constant phase or time difference from the start of a frame from one of the MNO sectors. Instead, the time difference of the start of a frame will constantly be ahead more and more or behind more and more, in other words, the rogue base station frame timing will drift with respect to the MNO sectors. Drift may be expressed in units of seconds per second, therefore, it may expressed, for example, as a ppm value. The drift occurs because a rogue base station is likely to be free running; i.e., not frequency or phase locked to the MNO network. Coherency of edge timing is also measured, in some embodiments, as a phase error. A collection of phase error observations is characterized by a phase noise power.

With respect to frame timing drift, a sustained average drift of $3.072*T_s$ or more per 10 ms (milliseconds), for multiple consecutive observations (e.g., for 10*10 ms=100 ms) indicates the clock source has an error of 10 ppm. An error of 10 ppm is 100 times the maximum clock source error tolerated by the LTE specification. An observed frame timing drift in violation of the wireless specification under which the base station appears to operate constitutes a measurement in the suspicious observation zone 232. Threshold values are, e.g., 3×, 10×, 30×, or 100× the specification-tolerated frame timing drift.

Physical Cell ID Observations

The physical cell ID, modulo 3, of rogue base station 131 may be the same as the physical cell ID of MNO sector 111 or 112 because rogue base station 131 is not part of the system numbering plan of the MNO operator. A distant legitimate signal may have the same physical cell ID modulo 3; this event can be ruled out by checking RSSI values. The strong signal from rogue base station 131 is simply an imposter event was not designed into the system by the MNO operator. Therefore, even though the signals 131-L and 111-L cover substantially the same geographic area, device 101 can learn from observations, in some instances, that the physical cell ID modulo 3 of each is the same value while both source signals have strong RSSI values as observed by the device 101. In an actual system, a numbering plan providing two signals with the same physical cell ID modulo 3 would degrade system capacity, and degrading system capacity is contrary to the goals of the mobile network operator. The rogue operator is indifferent to system capacity. Therefore, detecting a same physical cell ID modulo 3 on two strong signals constitutes a sample in the suspicious observation zone 232 of FIG. 2.

The device 101 then determines which of the two signals with the same physical cell ID modulo 3 is suspicious. The pilot signal (e.g. PSS and SSS) of the link signals 111-L are frequency locked with those of 112-L (and others, such as 114-L and M1-L of FIG. 1) and signals 131-L drift with respect to 112-L, 114-L and M1-L, the device 101. The source of the drifting signal is deemed suspicious and the source of the signal frequency-locked to other nearby cells is deemed legitimate; this comparison be referred to as a drift check. With respect to FIG. 10, then, the device 101, in some embodiments, categorizes the signals 131-L as coming from a suspicious source based on physical cell ID, RSSI and pilot measurements of rogue base station 131 and of link signals 111-L and 112-L. The device 101, in some embodiments, also considers if one cell is broadcasting a tracking area code (TAC) that would require a tracking area update (TAU). A rogue operator may use a TAU event to gain more information about a UE. An observation for a particular cell that is near the decision rule (line) 201 would be pulled into the suspicious observation zone 232 if the particular cell is broadcasting a TAC different than other nearby cells.

In some embodiments, a device comprises a memory and one or more processors. The memory includes instructions that when executed by a processor of the one or more processors causes the mobile device to perform operations comprising: measuring an RSSI value associated with a base station; determining a physical cell ID of the base station; and avoiding communication with the base station based on: i) the RSSI value, ii) the physical cell ID and iii) a discrepancy with a second base station. For example, the discrepancy with the second base station may be that the second base station is associated with the same physical cell ID as the base station.

In some embodiments, the device detects a physical cell ID of a first base station; determines a physical cell ID set for a possible second base station in a sector arrangement with the first base station; attempts to detect a presence of a signal from the second base station with a second physical cell ID in the set; and when the presence of the second base station is not detected: avoids communication with the first base station.

TA Observations

Device 101 also collects observations of TA values as shown in FIG. 10. Timing advance is an indicator of time-of-flight of a radio signal from the source cell to the observing device. The mobile network operator provides TA signals to the devices 101, 102, . . . , N, so that their uplink signals arrive at substantially the same time at a base station receiver relying on some subset of those signals for information recovery. Near coincident time-of-arrival helps preserve waveform orthogonality and waveform orthogonality is exploited to optimize system capacity. The mobile network operator wants sensible TA values while the rogue operator is indifferent to system capacity. In a small cell scenario, the TA values should be small, reflecting the small cell radius. In a large cell scenario, TA values should tend to be large when the observed signal has a somewhat low RSSI value. The parameters of the RACH configuration broadcast in SIB2 can be used by the device 101 to estimate whether a given received signal is associated with a small cell or a large cell.

Device 101, in some instances may observe that signal 131-L is associated with a large TA value ("131_TA") and a high RSSI value ("131_RSSI") while link signal 111-L is associated with a small or moderate TA value ("111_TA") and a lower RSSI value ("111_RSSI"). An observation obeying the inequalities 131_TA>111_TA and 131_RSSI>111_RSSI constitutes an observation in the suspicious observation zone. Device 101 can obtain a check of the legitimacy of the link signal 111-L using the drift check described above with respect to physical cell ID.

Observation/Comparison Logic

Figure 11:
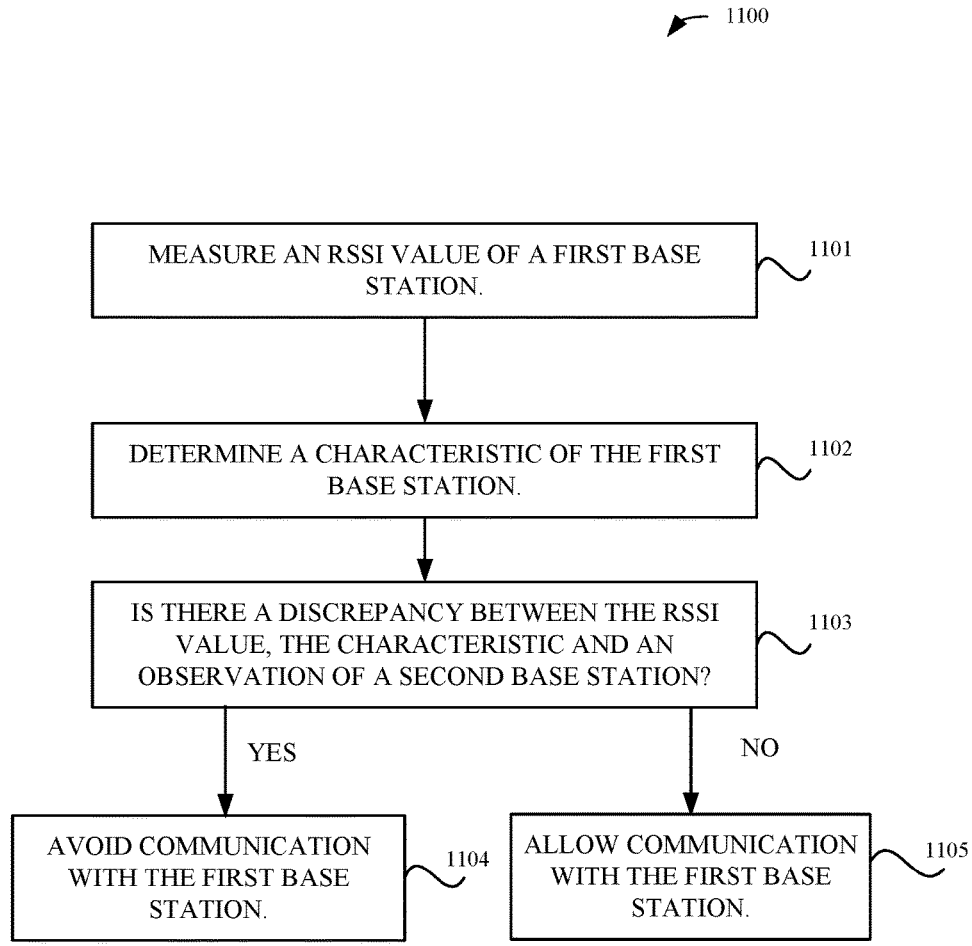
FIG. 11 illustrates exemplary logic for comparing a measurement of a first base station with an observation of a second base station, according to some embodiments.

FIG. 11 provides exemplary logic 1100 for detecting a rogue base station. At 1101, a device measures an RSSI value of a first base station. At 1102, the device determines a characteristic of the first base station. The characteristic may be a physical cell ID or a TA value, for example. At 1103, the device determines whether there is a discrepancy between the RSSI value, the characteristic and an observation of a second base station. The second base station observation can include TA values, RSSI values, physical cell ID values, and frequency synchronization or drift observations with respect to other nearby base stations signals. The RSSI values, physical cell ID values and frequency synchronization or drift observations can be based on pilot signal observations. If a discrepancy is found, the logic flows to 1104 and the device avoids communication with the first base station. If no discrepancy is found, the logic flows to 1105 and the device allows communication with the first base station. Allowing communication includes considering the first base station as eligible for reselection and/or permitting an on-going communication with the first base station to continue.

Observation/Comparison Message Flow

Figure 12:
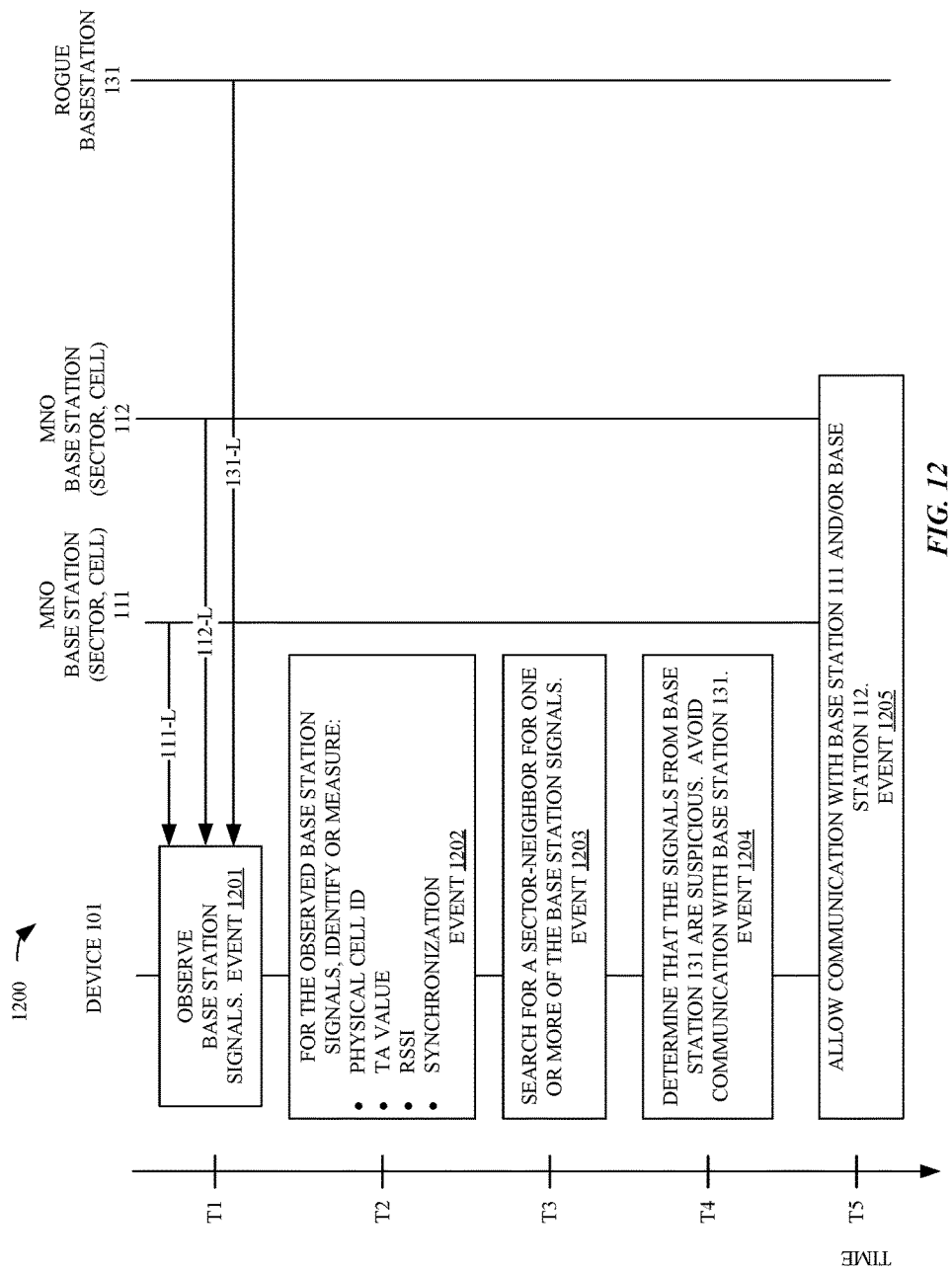
FIG. 12 illustrates an exemplary message flow for determining whether signals and/or measurements of a base station are suspicious, according to some embodiments.

FIG. 12 illustrates an exemplary message flow 1200. At approximately a time T1 denoted event 1201, the device 101 observes a collection of observed cells. For example, the device 101 observes link signals 111-L, 112-L and 131-L from MNO sector 111, MNO sector 112 and rogue base station 131. Base station, sector, and cell are equivalent expressions as used herein. The term sector emphasizes a directional pattern of a base station signal covering a specific more-or-less pie-shaped geographic area. At a time T2 and event 1202, substantially the same as T1, the device 101 identifies or measures physical cell ID values, TA values, RSSI values, and synchronization levels for each signal (ID, TA, RSSI) or for pairs of signals (synchronization). At a time T3 and event 1203, the device 101 searches for a sector-neighbor of one or more of the sectors or cells. Device 101 uses RSSI values and the physical cell ID or RSSI values and TA values to see if any of the signals are suspicious. Thus, the device 101 in the example of FIG. 12 determines at time T4 (event 1204) that the signals 131-L are sourced or provided by a suspicious base station (in this case, rogue base station 131) and are to be avoided. Coincident with this, the device 101 determines that the link signals 111-L and 112-L are from normal sectors, cells or base stations (these terms are equivalent). At time T5, event 1205, the device 101 then allows communication with base station 111 and/or base station 112.

Sudden RSSI Increase and S Criterion

Figure 13:
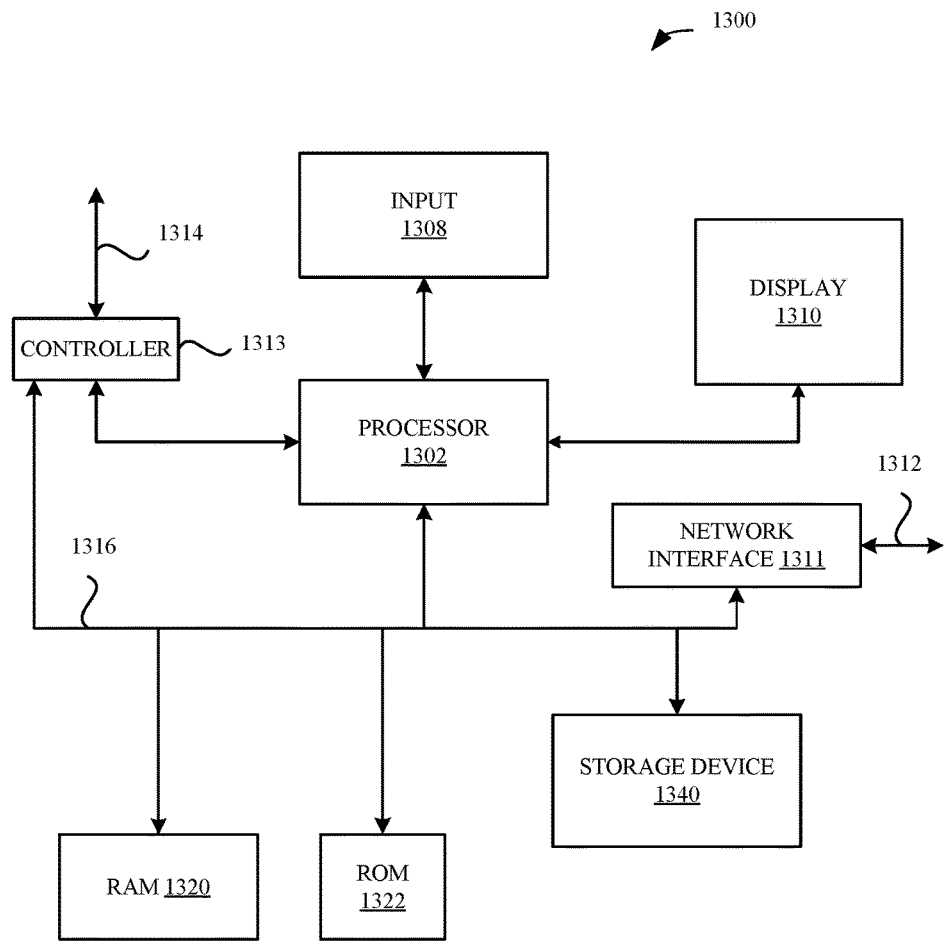
FIG. 13 illustrates an exemplary apparatus for implementation of the embodiments disclosed herein, according to some embodiments.

In some embodiments described by the logic of FIG. 12 and the events of FIG. 13, device 101 measures RSSI values of a first and a second base station over time. These measurements provide an RSSI trajectory for each base station. The shape of the trajectory is dependent on several factors which may be referred to as part of propagation geometry. Propagation geometry includes things such as motion of the device, motion of shadowing radio path obstacles near the device or near one or the other base stations, beam pattern of each base station and orientation of the device (in the user's hand, by the head, laid apart on a table, etc.). Event 301 includes collection of sample trajectories; this also is one embodiment of 1101 and 1103 of FIG. 11. These sample trajectories may be referred to as a first set of statistics. The first set of statistics is then characterized in event 302 (also represented by 1102 of FIG. 11). One aspect of the trajectories will be a rate of change of RSSI versus time. Events 303 and 304 are used to characterize a rate of change of RSSI for a possible rogue base station to collect a second set of statistics or a model if observations are not available or are unknown. At event 305 a decision rule is created that separates the first and second set of statistics complemented with a reselection aspect. That is, observations of MIB1 reveal whether an unknown base station is broadcasting parameters which favor reselection or handover. Examples of these parameters are q-RxLevMin and q-RxLevMinOffset used to calculate S-criterion.

In some embodiments, a device performs a method including measuring a first received signal strength indication (RSSI) value of a first base station at a first time; measuring a second RSSI value of a second base station at the first time; storing the first and second RSSI values in a first cell scan list at the first time; measuring a third RSSI value of the first base station at a second time; measuring a fourth RSSI value of the second base station at the second time; and storing the second and third RSSI values in a second cell scan list at the second time. In one embodiment of the method, when a rate of change from the first RSSI value to the second RSSI value with respect to a difference of the first and second times exceeds an RSSI rate threshold: the device then avoids communication with the first base station.

Wireless Devices, General Discussion

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Multiple access schemes can be based on time division, frequency division, and hybrids of these, for example direct sequence spread spectrum code division. When a transmitter has multiple antennas, more than one receiver can be served at the same time based on beamforming if the transmitter has channel state information. When both the transmitter and the receiver have two or more antennas, multiple streams can be sent by the transmitter to the receiver. These streams can be separated at the receiver when channel state information is known with respect to the transmit and receive antennas. Each transmitted stream corresponds to a particular transmit vector based on a decomposition of a joint channel matrix.

Representative Exemplary Apparatus

FIG. 13 illustrates in block diagram format an exemplary computing device 1300 that can be used to implement the various components and techniques described herein, according to some embodiments. In particular, the detailed view of the exemplary computing device 1300 illustrates various components that can be included in the device 101 illustrated in, e.g., FIGS. 1, 8A, 8B, and 9. A wireless device may also be referred to as a mobile device herein. As shown in FIG. 13, the computing device 1300 can include a processor 1302 that represents a microprocessor or controller for controlling the overall operation of computing device 1300. The computing device 1300 can also include a user input device 1308 that allows a user of the computing device 1300 to interact with the computing device 1300. For example, the user input device 1308 can take a variety of forms, such as a button, keypad, dial, touch screen, audio input interface, visual/image capture input interface, input in the form of sensor data, etc. Still further, the computing device 1300 can include a display 1310 (screen display) that can be controlled by the processor 1302 to display information to the user (for example, information relating to incoming, outgoing, or active communication session). A data bus 1316 can facilitate data transfer between at least a storage device 1340, the processor 1302, and a controller 1313. The controller 1313 can be used to interface with and control different equipment through an equipment control bus 1314. The computing device 1300 can also include a network/bus interface 1311 that couples to a data link 1312. In the case of a wireless connection, the network/bus interface 1311 can include wireless circuitry, such as a wireless transceiver and/or baseband processor.

The computing device 1300 also includes a storage device 1340, which can comprise a single storage or a plurality of storages (e.g., hard drives), and includes a storage management module that manages one or more partitions within the storage device 1340. In some embodiments, storage device 1340 can include flash memory, semiconductor (solid state) memory or the like. The computing device 1300 can also include a Random Access Memory ("RAM") 1320 and a Read-Only Memory ("ROM") 1322. The ROM 1322 can store programs, utilities or processes to be executed in a non-volatile manner. The RAM 1320 can provide volatile data storage, and stores instructions related to the operation of the computing device 1300.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. In some embodiments, the computer readable medium is a non-transitory computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method comprising:
by a mobile device:
receiving signaling messages from a base station;
measuring a rate of the signaling messages;
measuring a waveform accuracy of the base station;
when the rate of the signaling messages is above a signaling message rate threshold or the waveform accuracy is below an accuracy threshold:
avoiding communication with the base station; and
when the rate of the signaling messages is not above a signaling message rate threshold and the waveform accuracy is not below an accuracy threshold:
allowing communication with the base station.

2. The method of claim 1, wherein avoiding communication comprises reselecting to a second base station.

3. The method of claim 1, wherein avoiding communication comprises marking an identifier of the base station as ineligible in a cell scanning list.

4. The method of claim 1, wherein allowing communication comprises continuing an exchange of user traffic via the base station.

5. The method of claim 1, wherein allowing communication comprises reselecting to the base station.

6. The method of claim 1, wherein the waveform accuracy is based on an observed Doppler shift of a pilot signal received from the base station.

7. The method of claim 1, wherein measuring the rate of the signaling messages comprises measuring a rate of random access channel response (RAR) messages from the base station.

8. The method of claim 1, wherein the waveform accuracy is based on a synchronization accuracy of a pilot signal received from the base station.

9. The method of claim 8, wherein the synchronization accuracy is a measure of a frequency error and the accuracy threshold is a threshold frequency error value.

10. The method of claim 8, wherein the synchronization accuracy is a measure of a phase error and the accuracy threshold is a threshold phase noise power value.

11. The method of claim 1, wherein the accuracy threshold is adjusted based on a speed value of the mobile device.

12. The method of claim 11, wherein the speed value of the mobile device is estimated based on a motion sensor in the mobile device.

13. The method of claim 1, wherein measuring the rate of the signaling messages comprises measuring a rate of negative acknowledgement (NACK) messages from the base station.

14. The method of claim 13, wherein measuring the rate of the signaling messages further comprises measuring a rate of uplink access grant request messages sent to the base station.

15. A method comprising:
by a mobile device:
receiving signaling messages from a base station;
measuring a rate of the signaling messages;
measuring a waveform accuracy of the base station;
measuring a received signal strength indication (RSSI) value associated with a pilot signal of the base station;
when: i) the rate of the signaling messages is above a signaling message rate threshold or the waveform accuracy is below an accuracy threshold, and
ii) the RSSI value is above an RSSI threshold:
avoiding communication with the base station; and
when: i) the rate of the signaling messages is not above a signaling message rate threshold and the waveform accuracy is not below an accuracy threshold,
or ii) the RSSI value is not above an RSSI threshold:
allowing communication with the base station.

16. The method of claim 15, wherein the mobile device operates in compliance with a 3rd Generation Partnership Project (3GPP) Long Term Evolution (LTE) standard.

17. A mobile device comprising:
a memory; and
one or more processors, wherein the memory includes instructions that when executed by a processor of the one or more processors, cause the mobile device to perform operations comprising:
measuring a first received signal strength indication (RSSI) value associated with a first base station,
measuring a second RSSI value associated with a second base station, determining a first physical cell identifier (ID) value and a first timing advance (TA) value for the first base station, determining a second physical cell ID value and a second TA value for the second base station, and avoiding communication with the first base station when:

the first physical cell ID value equals the second physical cell ID in a modulo-3 sense, the first RSSI value is greater than the second RSSI value, and the first TA value is greater than the second TA value.

18. The mobile device of claim 17, wherein the operations further comprise:

comparing a first pilot signal of a third base station with a second pilot signal of the second base station to produce a synchronization observation; and allowing communication with the second base station based on the synchronization observation.

19. The mobile device of claim 18, wherein the synchronization observation comprises a measure of frequency locking between the first pilot signal of the third base station and the second pilot signal of the second base station.

20. The mobile device of claim 18, wherein the synchronization observation comprises a comparison of a frame timing drift to a threshold.

* * * * *